Feb. 6, 1962 F. BAUR 3,019,846
SENSITIVITY COMPENSATED BALANCE
Filed April 7, 1960 2 Sheets-Sheet 1

INVENTOR.
FRITZ BAUR
BY
Horace B. Van Valkenburgh
ATTORNEY

Feb. 6, 1962 — F. BAUR — 3,019,846
SENSITIVITY COMPENSATED BALANCE
Filed April 7, 1960 — 2 Sheets—Sheet 2

INVENTOR.
FRITZ BAUR
BY
ATTORNEY

3,019,846
SENSITIVITY COMPENSATED BALANCE
Fritz Baur, Denver, Colo., assignor to Wm. Ainsworth & Sons, Inc., Denver, Colo., a corporation of Colorado
Filed Apr. 7, 1960, Ser. No. 20,762
10 Claims. (Cl. 177—246)

This invention relates to precision analytical balances and more particularly to such balances in which the effects of ambient temperature changes upon the sensitivity of the balance are compensated for or counteracted.

In balances in which the weight of an object or article being weighed is counterbalanced exactly with weights, such as placed upon a pan suspended from one end of a beam pivoted at the center, with the object or article being weighed placed in a pan suspended from the opposite end of the beam, the effect of temperature change upon sensitivity is not of extreme importance, since the beam is normally brought back into exactly the same position it occupied initially, with a pointer responsive to the deflection of the beam being used only to indicate the exactness with which the counterbalancing weights equal the weight of the objects being weighed. All of the counterbalancing weight need not necessarily be placed in a pan, since such proportion as desired of the counterbalancing weight may be produced by placing a rider or riders on the balance beam, or by use of a chain connected at one end to the balance beam with the opposite end of the chain moved upwardly or downwardly, to cause a lesser or greater proportion of the weight of the chain to be borne by the beam. However, for sufficient rapidity in weighing, coupled with the necessary accuracy, the application of weights, either onto a pan or applied by riders, or by a chain, can be quite time consuming and other types of balances are more often used, in which the weight of the object being weighed is merely counterbalanced to a relatively rough extent, comparatively speaking, with the deflection of the beam being measured, to provide the last several decimal places of the indicated weight. In this connection, it will be noted that for analytical accuracy, the balance should indicate the weight of the object of one tenth of a milligram, for semi-micro accuracy to one one-hundredth of a milligram, and for micro accuracy, to one one-thousandth of a milligram. As will be evident, the greater the number of decimal places which can be indicated by deflection of the beam, the greater is the rapidity with which weighing operations can be carried out. Thus, in more modern balances, it is customary to obtain the last two to four decimal places through measurement of the inclination of the beam. However, if the sensitivity of the beam varies, a direct influence on the accuracy of the weighing result will be produced. One of the more important factors affecting sensitivity is the effect of ambient temperature changes and it is this effect to which the principles of the present invention are directed.

The sensitivity of an analytical balance may be defined as the ratio between the angular deflection or movement of the balance beam and the increment of weight which causes the deflection. Also, the effect of temperature changes upon the sensitivity of the balance will be discussed hereinafter, in connection with a diagrammatic representation of a conventional balance beam and certain associated parts.

A more common type of modern balance in which the deflection of the beam is measured to obtain the last two to four decimal places of the weight reading is the substitution type of balance, in which a counterweight is supported from the end of the beam opposite the end from which a pan or other support for the object being weighed is suspended, while removable weights are suspended from the same end of the beam as the object being weighed. These weights are removed until the weight of the object being weighed is approximated, i.e., the weight of the object being weighed is substituted for the weights removed. Of course, the deflection of the beam is again utilized to provide an indication of the last few decimal places, such as two to four, of the weight of the object. For a better understanding of the operation of a substitution type balance and several different ways in which the deflection of the beam can be indicated, reference is made to my copending application Serial No. 16,990, filed March 23, 1960. In general, one system for obtaining an indication of the deflection of the beam is to provide a light source at one side of the balance case, for projecting light onto a reflecting mirror, thence through a condensing lens, then a graticule having indicia thereon and mounted on the beam itself, then through an objective lens which focuses the image of the graticule on a reflecting mirror, which in turn reflects the image onto a screen conveniently mounted on the opposite side of the case. In another system, a source of light is mounted on the balance case at one side, for directing light through a condensing lens, a fixed graticule and an objective lens onto a fixed mirror, from which the light is reflected onto a mirror mounted on the beam and movable therewith, thence onto another reflecting mirror and thence onto a screen. In the latter instance, the mirror mounted on the beam will shift as the beam shifts in position, so that the image of the indicia on the graticule will be reflected to different portions of the screen in accordance with the beam deflection. Of course, an indication of the deflection of the beam may be produced in any other suitable manner. Although the principles of this invention are not limited thereto, they are particularly applicable to the instance of a substitution balance which is provided with a counterweight.

Among the objects of this invention are to provide a novel analytical balance; to provide such a balance in which the effect of temperature changes upon the sensitivity of the balance is compensated for or counteracted; to provide such a balance in which such compensation is provided in an efficient and effective manner; and to provide such a balance in which such compensation is provided without unduly complicating the construction of the balance.

Additional objects and the novel features of this invention will become apparent from the description which follows, taken in connection with the accompanying drawings, in which.

Figure 1:
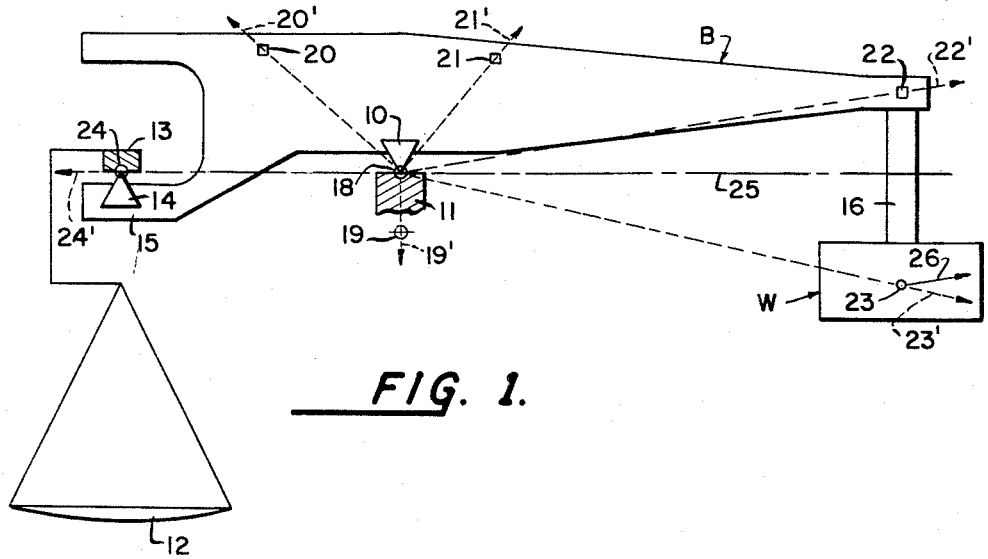
FIG. 1 is a partly diagrammatic, front elevation of a balance beam and certain associated parts, illustrating the problem involved and the manner in which it is overcome by the present invention.

As illustrated partly diagrammatically in FIG. 1, the principles of this invention may be applied to a balance which includes a beam B, mounted for pivotal movement by a knife edge bearing 10 engaging a rest block 11, with a pan 12, in which an article or object to be weighed is placed, supported at one end and a counterweight W at the opposite end of the beam. The pan 12 may be suspended from a bearing block 13, engaging a knife edge bearing 14 mounted on a flange 15 of the beam, while counterweight W may be supported by a stud 16. The suspension of pan 12 is shown diagrammatically, but it will be understood that the bearing block 13 may support a gimbal, in turn supporting a rack on which removable weights are placed, with a hook at the lower end of the rack from which pan 12 is suspended, as in the manner disclosed in my aforesaid copending application Serial No. 16,990, filed March 23, 1960. It will also be understood that the balance may include other conventional parts, such as a case, a column or other suitable means for supporting bearing block 13, suitable mechanism for removing and replacing weights on the weight rack for substitution weighing, damping mechanism, such as an air dash pot associated with the counterweight W, means for indicating deflection of the beam, as by projection of indicia on a graticule onto a scale through a light system including lenses and/or mirrors, and suitable arrestment mechanism for moving the beam knife edge bearing 10 off rest block 11 and also the bearing block 13 off the knife edge bearing 14.

In considering the effect of temperature changes and thermal effects on the sensitivity of an analytical balance, namely, the ratio between the angular deflection or excursion of the balance beam and the weight increment causing deflection, a convenient point of reference is the point 18 which is the point of support, i.e., the point at which the knife edge bearing 10 engages the rest block 11. The center of gravity 19 of the beam and associated parts must be below the center of support 18, in order to permit the beam to come to a rest position, so that the inclination of the beam can be indicated in a suitable manner, to obtain the last two to four decimal places of the weight indication. In the event that the ambient temperature rises and the beam and associated parts are heated, the beam will expand and each particle, such as at the points 20 and 21, above and to the left and right of the knife edge bearing 10, and also the particle 22, just above the counterweight W, will move directly away from the center of support 18 for a distance proportional to the distance from the center of support 18, as represented by the dotted lines 20', 21' and 22', respectively, exaggerated in length for clarity of illustration, the additional dotted lines between the respective particles 20, 21 and 22 and the reference point 18 being drawn to determine the direction of the respective lines 20', 21' and 22', and similarly for the dotted lines extending between reference point 18 and the center of gravity 23 of counterweight W and the center of support 24 of pan 12. In addition, the center of gravity 19 will move downwardly, as indicated by the dotted line 19', thus tending to decrease the sensitivity of the balance. Also, the center of gravity 23 of the counterweight W will move outwardly and downwardly, as indicated by the dotted line 23', while the center of support 24 of the pan 12 will move to the left, as indicated by the dotted line 24'. In the event that the beam is completely homogeneous, i.e., all parts are formed of material having the same coefficient of expansion, the movement to the left, of the center of support 24 of the pan, will counteract the downward movement of the center of gravity 19, since elongation of the left portion of the beam will provide a longer lever arm for the pan. Thus, if the balance beam B and its associated parts are homogeneous and thereby have the same coefficient of expansion, changes, in temperature should not adversely affect sensitivity of the balance.

However, balance beams are not homogeneous, since the knife edge bearings 10 and 14, particularly the former, are normally made of semi-precious stone, used because of its hardness, which has a smaller coefficient of thermal expansion than the metal of the remainder of beam B. Thus, semi-precious stones have a coefficient of expansion of about one half the coefficient of expansion of ferrous metals and about one fourth the coefficient of expansion of non-ferrous alloys. In order to provide a beam which is as light in weight as possible and avoid the presence of magnetic material, the metal portions of the beam are conveniently made of aluminum or similar lightweight metals which, however, have a greater coefficient of expansion than ferrous metals and thereby increase the problems due to the effects of temperature changes upon the sensitivity of the balance. The counterweight W may be made of aluminum but more conveniently of heavier material, such as non-magnetic brass, to permit a concentration of weight in a small volume. However, brass has a coefficient of thermal expansion approximately that of aluminum. Thus, assuming now that beam B and stud 16 are formed of aluminum or similar material and counterweight W of brass, but that the knife edge bearing 10 is a semi-precious stone, upon an increase in temperature, beam B and stud 16 will expand as before, but the knife edge bearing 10 will expand considerably less, so that the center of gravity 19 will be moved downwardly a greater distance than when the beam and associated parts were homogeneous. As will be evident, the greater the distance between the center of support 18 and the center of gravity 19, the less the beam will deflect when a given weight is placed on pan 12, and the sensitivity will be lessened to a corresponding degree. Placement of the counterweight W below the horizontal center line 25 of the center of support 18 accomplishes a dual purpose. First, that of counterbalancing the weight of the beam and the weight of the pan 12 and associated parts, including the weight rack and weights thereon and the object being weighed, and, second, to cause the center of gravity 19 to be directly below the center of support 18. However, the center of gravity 19 would not move downwardly, or would move downwardly to considerably lesser extent, if upon heating, the counterweight W did not move downwardly along dotted line 23' but instead moved upwardly along the line 26, for instance, and the effect of temperature change upon sensitivity could thereby be compensated for.

In accordance with this invention, the latter may be accomplished by forming stud 16 of a material which has a considerably smaller coefficient of thermal expansion than the material of which beam B is made. Invar steel would be a suitable material for this purpose, except for its magnetic properties, so that non-magnetic material having a higher coefficient of thermal expansion than Invar, but less than that of aluminum, is preferred. Non-magnetic stainless steel, such as austenitic stainless steel having a coefficient of thermal expansion materially less than aluminum and brass, is suitable, although other non-magnetic material having a low coefficient of expansion, such as ceramic or glass, may also be suitable. For austenitic stainless steel, the magnetic susceptibility appears to be at a minimum at about 22% Ni. When stud 16 is made of such material, it will expand upon heating to a considerably lesser extent than the remainder of the beam and the distance between the particle 22 and center of gravity 23 of counterweight W will remain substantially constant, or will be considerably less than when stud 16 is made of the same material as beam B. With a stud 16 having such a lesser coefficient of thermal expansion, the counterweight W can actually be made to move upwardly, in the direction of the line 26, rather than downwardly as before, so that the center of gravity 19 of the beam and its associated parts will not shift downwardly as before, or will shift downwardly to a minimum extent. Thus, the principles of this invention are attained by forming an element of the balance, which supports a significant portion thereof below the horizontal line of the center knife edge, of material having a coefficient of thermal expansion materially less than the rest of the beam.

Figure 3:
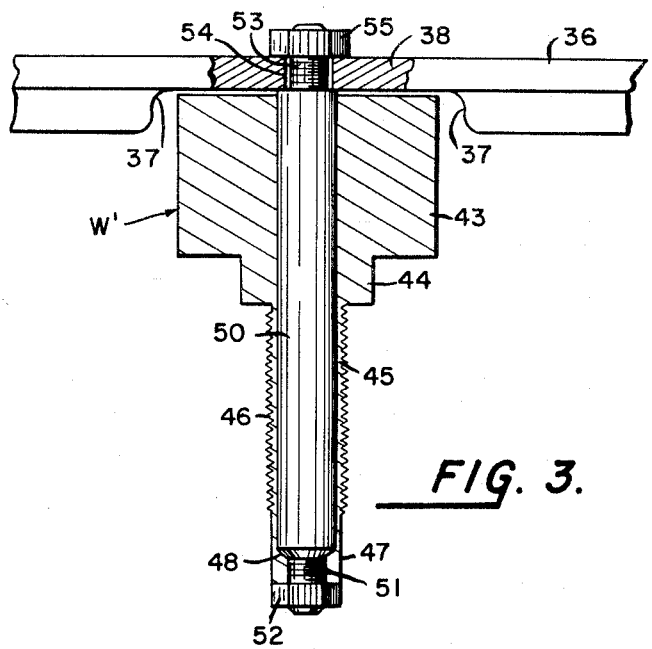
FIG. 3 is a fragmentary front elevation, on an enlarged scale, of a portion of the beam of FIG. 2, including a counterweight and its support, with the central portion thereof in longitudinal section for clarity of illustration.
Figure 2:
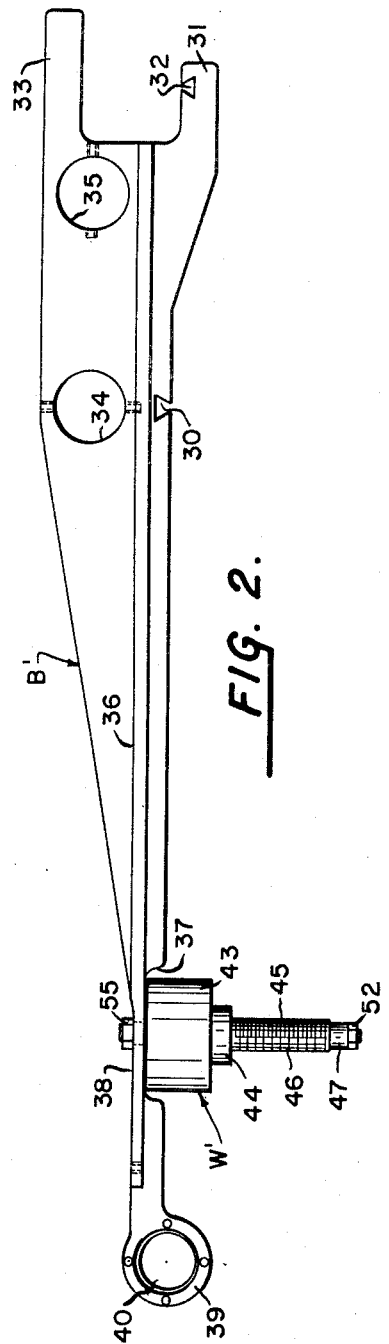
FIG. 2 is a front elevation of a beam of a modern analytical balance, embodying the principles of this invention.

The principles of this invention may be applied to a commercial analytical balance in the manner shown in FIGS. 2 and 3. As in FIG. 2, beam B' is provided with a socket 30 for a central knife edge bearing, similar to knife edge bearing 10 of FIG. 1, and an outwardly extending flange 31 having a socket 32 for a knife edge bearing, similar to knife edge bearing 14 of FIG. 1, on which may rest a bearing block for supporting the weight rack and pan. The beam may also be provided with an upper flange 33, to which may be attached means for engaging an arrestment mechanism, and apertures 34 and 35 for receiving a sensitivity adjustment nut and a zero adjustment nut, respectively adjustable in horizontal and vertical planes. A flange 36 extends to either side of the beam to add rigidity, while a recess 37 is provided in the beam web below flange 36, in a section 38 of the beam having the same depth as flange 36, to acccommodate a counterweight W', which is attached to the beam in the manner described below. That end of the beam may be formed as a circular eye 39, in which is mounted a graticule 40 having appropriate indicia thereon for projection onto a screen through a system of lenses and mirrors, as in the manner described previously.

As in FIG. 3, the counterweight W' may comprise an upper cylindrical section 43 provided with a lower shoulder 44 and a depending sleeve 45 having exterior threads 46, for engagement with a nut by which an air dash pot or damper disc is secured against shoulder 44. Sleeve 45 is provided with a socket 47 at its lower end, in turn provided with a conical shoulder 48 which fits against a similar shoulder formed at the lower end of a stud 50. Stud 50 extends downwardly within counterweight W', the latter having an annular bore provided with a sliding fit for the stud, so that the counterweight may expand and contract on the stud, from its lower end. The lower end of stud 50 is provided with a threaded extension or post 51, to which a nut 52 may be attached for clamping the socket 47 to the lower end of the stud. The upper end of stud 50 is provided with a threaded extension or post 53, which extends upwardly through a bore 54 in section 38 of the beam and to which a nut 55 may be attached for clamping the stud to the beam. As will be evident, the upper portion of upper cylindrical section 43 of counterweight W' is received in recess 37, with a slight clearance for expansion and contraction. As will also be evident, the center of gravity of counterweight W' and stud 50 need not be any considerable distance below the horizontal line 25, since the counterweight and stud need cause the center of gravity 19 of FIG. 1 to be a few thousandths of an inch below the center of support 18.

Since the lower end of counterweight W' is attached to the lower end of stud 50, upon a rise in temperature and consequent expansion of the beam and its associated parts, the center of gravity of the counterweight W' will actually move upwardly, since the counterweight W' is formed of a material, such as brass, having a greater coefficient of expansion than stud 50, formed of material such as austenitic stainless steel or other material having a lower coefficient of expansion than aluminum or brass. Thus, upon a rise in temperature and consequent expansion of the beam and its associated parts, the smaller expansion of stud 50 will cause the center of gravity of the counterweight W' actually to rise, so as to compensate for the tendency for the center of gravity of the beam and associated parts to be lowered due to expansion and thereby produce little or no upward or downward movement of the center of gravity 19 of FIG. 1. As will be evident, the minimum of movement of the center of gravity of the beam due to expansion on heating will overcome the normal tendency for heating to cause the center of gravity of the beam and its associated parts to be lowered, with a consequent decrease in the sensitivity of the balance.

Similarly, if the ambient temperature should fall, the beam B' and its associated parts will tend to contract, thereby tending to cause the center of gravity of the beam and its associated parts to rise. However, since the stud 50 will contract to a lesser extent than the counterweight W', the center of gravity of the counterweight W' will actually be lowered, since the counterweight W' contracts to a greater extent than the stud 50, thus compensating for the tendency for the rest of the beam to cause the center of gravity 19 to rise and thereby maintaining the sensitivity at approximately the same value as prior to a fall in the ambient temperature.

From the foregoing, it will be evident that an analytical balance constructed in accordance with this invention will provide to a marked degree the requirements and objects hereinbefore set forth. Thus, by utilizing an element of the balance formed of material having a coefficient of thermal expansion materially less than the beam, to support a significant portion of the balance below the horizontal line of the center knife edge, most conveniently a stud which supports a counterweight, the effect of temperature changes upon the sensitivity of the balance is compensated for or counteracted. Particularly when a stud supporting the counterweight is utilized as the above element, such compensation is provided for in an efficient and effective manner and also does not unduly complicate the construction of the balance.

Although a preferred embodiment of this invention has been illustrated and described and variations in the material of the stud indicated, it will be understood that other embodiments may exist and other suitable materials may be utilized, without departing from the spirit and scope of this invention.

What is claimed is:

1. In a balance including a beam formed of metal and supported by a horizontal knife edge bearing having a coefficient of thermal expansion less than the coefficient of thermal expansion of the metal of said beam, means for supporting an object to be weighed from one end of said beam and a weight from the opposite end of said beam, the improvement comprising an element supporting said weight from said beam and below the horizontal line of said knife edge bearing, said element being formed of material having a coefficient of thermal expansion materially less than the coefficient of thermal expansion of the metal of said beam.

2. In a balance including a beam formed of metal and supported by a horizontal knife edge bearing having a coefficient of thermal expansion less than the coefficient of thermal expansion of the metal of said beam, means for supporting an object to be weighed from one end of said beam and a counterweight from the opposite end of said beam, the improvement comprising a stud supporting said counterweight from said beam and formed of material having a coefficient of thermal expansion materially less than the coefficient of thermal expansion of the metal of said beam.

3. In a balance as defined in claim 2, wherein said counterweight is attached to the lower end of said stud.

4. In a balance as defined in claim 2, wherein said counterweight extends upwardly along said stud.

5. In a balance as defined in claim 2, wherein said counterweight is formed of metal having a coefficient of thermal expansion approximately the coefficient of thermal expansion of the metal of said beam.

6. In a balance as defined in claim 2, wherein said beam is formed of aluminum, said counterweight is formed of brass and said stud is formed of austenitic stainless steel.

7. In a balance as defined in claim 2, wherein said stud is formed of a material selected from the group consisting of ceramic and glass.

8. In a balance as defined in claim 6, wherein said stud is attached at its upper end to said beam and is provided adjacent its lower end with a tapered convex shoulder; said counterweight is provided with an upper cylindrical portion disposed adjacent said beam and a depending sleeve provided with a socket at its lower end having a tapered concave shoulder engaging said stud shoulder; and including means for attaching the lower end of said stud to the lower end of said sleeve.

9. In a balance as defined in claim 8, wherein said upper portion of said counterweight is provided with a lower shoulder for engagement with an air damper disc; and said sleeve is provided with exterior threads for a nut clamping said disc against said shoulder.

10. In a balance including a beam, the improvement comprising a stud extending downwardly from said beam and formed of material having a coefficient of thermal expansion materially less than the coefficient of thermal expansion of said beam; and a counterweight attached to the lower end of said stud and extending upwardly along said stud.

References Cited in the file of this patent

UNITED STATES PATENTS 2,950,099     Hodsman et al. _____ Aug. 23, 1960

OTHER REFERENCES

Fisher Scientific Company Bulletin FS–207.